(12) United States Patent
Suzuki (10) Patent No.: US 8,210,727 B2
(45) Date of Patent: Jul. 3, 2012

(54) VEHICLE HEADLAMP

(75) Inventor: Yasufumi Suzuki, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 351 days.

(21) Appl. No.: 12/555,249

(22) Filed: Sep. 8, 2009

(65) Prior Publication Data

US 2010/0067249 A1  Mar. 18, 2010

(30) Foreign Application Priority Data

Sep. 17, 2008 (JP) ................................. 2008-238245

(51) Int. Cl.
*B60Q 1/04* (2006.01)
*F21V 7/09* (2006.01)

(52) U.S. Cl. ......... 362/539; 362/517; 362/518; 362/297

(58) Field of Classification Search .................. 362/297, 362/298, 301, 507–549, 346
See application file for complete search history.

(56) References Cited

U.S. PATENT DOCUMENTS

| | | | |
|---|---|---|---|
| 6,439,745 B2 * | 8/2002 | Futami | 362/297 |
| 6,454,448 B2 * | 9/2002 | Taniuchi et al. | 362/517 |
| 6,494,603 B1 * | 12/2002 | Takada | 362/538 |
| 6,796,696 B2 * | 9/2004 | Taniuchi | 362/539 |
| 6,857,768 B2 * | 2/2005 | Watanabe et al. | 362/512 |
| 7,073,929 B2 * | 7/2006 | Iwasaki | 362/517 |
| 7,334,926 B2 * | 2/2008 | Takada | 362/517 |
| 7,452,115 B2 * | 11/2008 | Alcelik | 362/516 |
| 7,484,864 B2 * | 2/2009 | Okada | 362/300 |
| 7,607,811 B2 * | 10/2009 | Okada | 362/545 |
| 7,690,818 B2 * | 4/2010 | Takada et al. | 362/299 |
| 7,708,439 B2 * | 5/2010 | Naganawa et al. | 362/514 |
| 7,959,336 B2 * | 6/2011 | Iwasaki | 362/517 |
| 7,997,779 B2 * | 8/2011 | Futami | 362/539 |
| 2006/0164852 A1 * | 7/2006 | Mochizuki et al. | 362/539 |
| 2007/0019431 A1 * | 1/2007 | Kinoshita | 362/517 |
| 2008/0239741 A1 * | 10/2008 | Nakada et al. | 362/507 |

FOREIGN PATENT DOCUMENTS

JP  2008-041271 A  2/2008

OTHER PUBLICATIONS

D. F. Rogers et al., "Mathematical Elements for Computer Graphics," second edition, Copyright 1990, 1976, pp. 445-446.

* cited by examiner

*Primary Examiner* — Alan Cariaso
(74) *Attorney, Agent, or Firm* — Foley & Lardner LLP

(57) ABSTRACT

A vehicle headlamp of the present invention is provided with: a semiconductor-type light source; a main reflecting surface; a first auxiliary reflecting surface; a shade; a second auxiliary reflecting surface; a third auxiliary reflecting surface; and a fourth auxiliary reflecting surface. The shade forms a light distribution pattern for passing, having cutoff lines. The first auxiliary reflecting surface and the second auxiliary surface form a light distribution pattern for overhead sign. The first auxiliary reflecting surface, the third auxiliary reflecting surface, and the fourth auxiliary reflecting surface form an auxiliary light distribution pattern between the light distribution pattern for passing, having the cutoff lines, and a light distribution pattern for overhead sign. As a result, the vehicle headlamp of the present invention improves visibility.

11 Claims, 5 Drawing Sheets

FIG. 7

VEHICLE HEADLAMP

CROSS REFERENCE TO RELATED APPLICATIONS

This application claims priority of Japanese Patent Application No. 2008-238245 filed on Sep. 17, 2008. The contents of this application are incorporated herein by reference in their entirety.

BACKGROUND OF THE INVENTION

1. Field of the Invention

The present invention relates to a projector-type vehicle headlamp using a semiconductor-type light source such as an LED, for example, as a light source.

2. Description of the Related Art

A vehicle headlamp of this type is conventionally known (Japanese Laid-open Patent Application No. 2008-41271, for example). Hereinafter, the conventional vehicle headlamp will be described. The conventional vehicle headlamp is provided with: a light source; a first reflecting surface for reflecting light from the light source on a first illumination region; a light shading member for shading a part of the light reflected from the first reflecting surface; a second reflecting surface for reflecting the light from the light source; and a third reflecting surface for reflecting the light reflected from the second reflecting surface in a second illumination region. Hereinafter, functions of the conventional vehicle headlamp will be described. When the light source is lit, the light from the light source is reflected on the first reflecting surface; a part of the light reflected from the first reflecting surface is shaded by means of the light shading member; and a light distribution pattern for passing, having a cutoff line, is formed by the remaining part of the reflected light, and is illuminated in the first illuminated region. On the other hand, the light from the light source is reflected on the second reflecting surface; and the light reflected from the second reflecting surface is reflected on the third reflecting surface; and a light distribution pattern for overhead sign is illuminated in the second illumination region.

However, the conventional vehicle headlamp entails a problem concerning visibility, which could arise due to the fact that a dark matter exerted by optical dropout(s) takes place between a light distribution pattern for passing, having a cutoff line, and a light distribution pattern for overhead sign.

The present invention has been made to solve the above-described problem concerning visibility that remains unsolved in the conventional vehicle headlamp.

SUMMARY OF THE INVENTION

A first aspect of the present invention is directed to a vehicle headlamp, comprising:

(i) a semiconductor-type light source;
(ii) a reflector having a main reflecting surface and a first auxiliary reflecting surface for reflecting light from the semiconductor-type light source;
(iii) a shade for shading a part of light reflected from the main reflecting surface of the reflector to form a light distribution pattern having a cutoff line by a remaining part of the reflected light;
(iv) a second auxiliary reflecting surface for reflecting a part of the light reflected from the first auxiliary reflecting surface of the reflector, as a light distribution pattern for overhead sign;
(v) a third auxiliary reflecting surface for reflecting another part of the light reflected from the first auxiliary reflecting surface of the reflector;
(vi) a fourth auxiliary reflecting surface for reflecting the light reflected from the third auxiliary reflecting surface, as an auxiliary light distribution pattern, between the light distribution pattern having the cutoff line and the light distribution pattern for overhead sign; and
(vii) a projecting lens for forwardly projecting the light distribution pattern having the cutoff line, the light distribution pattern for overhead sign, and the auxiliary light distribution pattern.

A second aspect of the present invention is directed to the vehicle headlamp according to the first aspect, further comprising a holding member for holding the semiconductor-type light source, the reflector, the shade, and the projecting lens, wherein:

a cutout portion for light transmission is provided near the shade of the holding member;
the second auxiliary reflecting surface and the third auxiliary reflecting surface are provided on a face opposed to the first auxiliary reflecting surface of the cutout portion;
the fourth auxiliary reflecting surface is provided on a face at a side opposite to a side of shading a part of light reflected from the main reflecting surface of the shade;
the second auxiliary reflecting surface is a reflecting surface for, as a light distribution pattern for overhead sign, reflecting a part of light reflected from the first auxiliary reflecting surface, onto the projecting lens, the pattern having been passed through the cutout portion at a side opposite to a side of shading a part of light reflected from the main reflecting surface of the shade;
the third auxiliary reflecting surface is a reflecting surface for reflecting another part of the light reflected from the first auxiliary reflecting surface at a side opposite to a side of shading a part of light reflected from the main reflecting surface of the shade; and
the fourth auxiliary reflecting surface is a reflecting surface for reflecting light reflected from the third auxiliary reflecting surface onto the projecting lens, as an auxiliary light distribution pattern, between the light distribution pattern having the cutoff line and the light distribution pattern for overhead sign.

A third aspect of the present invention is directed to the vehicle headlamp according to the first aspect, wherein:

the shade has:
a first edge for forming the cutoff line in the light distribution pattern of the light reflected from the main reflecting surface of the reflector;
a second edge for forming a cutoff line corresponding to a cutoff line of the light distribution pattern in the light distribution pattern for overhead sign of light reflected from the second auxiliary reflecting surface; and
a third edge for forming a cutoff line corresponding to a cutoff line of the light distribution pattern in the auxiliary light distribution pattern of light reflected from the fourth auxiliary reflecting surface.

A fourth aspect of the present invention is directed to a vehicle headlamp, comprising:

(i) a semiconductor-type light source;
(ii) a reflector having a main reflecting surface and a first auxiliary reflecting surface for reflecting light from the semiconductor-type light source;
(iii) a shade for shading a part of light reflected from the main reflecting surface of the reflector to form a light distribution pattern having a cutoff line by a remaining part of the reflected light;

(iv) a second auxiliary reflecting surface for reflecting a part of light reflected from the first auxiliary reflecting surface of the reflector, as a light distribution pattern for overhead sign;

(v) an additional auxiliary reflecting surface for reflecting another part of the light reflected from the first auxiliary reflecting surface of the reflector, as an auxiliary light distribution pattern, between the light distribution pattern having the cutoff line and the light distribution pattern for overhead sign; and (vi) a projecting lens for forwardly projecting the light distribution pattern having the cutoff line, the light distribution pattern for overhead sign, and the auxiliary light distribution pattern.

A fifth aspect of the present invention is directed to the vehicle headlamp according to the fourth aspect, wherein:

the additional auxiliary reflecting surface comprises:
a third auxiliary reflecting surface for reflecting another part of the light reflected from the first auxiliary reflecting surface of the reflector; and
a fourth auxiliary reflecting surface for reflecting light reflected from the third auxiliary reflecting surface, as an auxiliary light distribution pattern, between the light distribution pattern having the cutoff line and the light distribution pattern for overhead sign.

A sixth aspect of the present invention is directed to the vehicle headlamp according to the fifth aspect, further comprising:

a holding member for holding the semiconductor-type light source, the reflector, the shade, and the projecting lens, wherein:
a cutout portion for light transmission is provided near the shade of the holding member;
the second auxiliary reflecting surface and the third auxiliary reflecting surface are provided on a face opposed to the first auxiliary reflecting surface of the cutout portion;
the fourth auxiliary reflecting surface is provided on a face at a side opposite to a side of shading a part of light reflected from the main reflecting surface of the shade;
the second auxiliary reflecting surface is a reflecting surface for, as a light distribution pattern for overhead sign, reflecting a part of light reflected from the first auxiliary reflecting surface, onto the projecting lens, the light distribution pattern having been passed through the cutout portion at a side opposite to a side of shading a part of light reflected from the main reflecting surface of the shade;
the third auxiliary reflecting surface is a reflecting surface for reflecting another part of the light reflected from the first auxiliary reflecting surface at a side opposite to a side of shading a part of light reflected from the main reflecting surface of the shade; and
the fourth auxiliary reflecting surface is a reflecting surface for reflecting light reflected from the third auxiliary reflecting surface, as an auxiliary light distribution pattern, between the light distribution pattern having the cutoff line and the light distribution pattern for overhead sign, onto the projecting lens.

A seventh aspect of the present invention is directed to the vehicle headlamp according to the fourth aspect, wherein:

the shade has:
a first edge for forming the cutoff line in the light distribution pattern of the light reflected from the main reflecting surface of the reflector;
a second edge for forming a cutoff line corresponding to a cutoff line of the light distribution pattern in the light distribution pattern for overhead sign of light reflected from the second auxiliary reflecting surface; and
a third edge for forming a cutoff line corresponding to a cutoff line of the light distribution pattern in the auxiliary light distribution pattern of light reflected from the fourth auxiliary reflecting surface.

An eighth aspect of the present invention is directed to a vehicle headlamp, comprising:

(i) a semiconductor-type light source;
(ii) a reflector having a main reflecting surface and a first auxiliary reflecting surface for reflecting light from the semiconductor-type light source;
(iii) a shade for shading a part of light reflected from the main reflecting surface of the reflector to form a light distribution pattern having a cutoff line by a remaining part of the reflected light;
(iv) a holding member for holding the shade, allowing a cutout portion for light transmission to be formed near the shade;
(v) a second auxiliary reflecting surface which is provided on a face opposed to the first auxiliary reflecting surface of the cutout portion of the holding member, for reflecting a part of light reflected from the first auxiliary reflecting surface of the reflector as a light distribution pattern for overhead sign;
(vi) an additional auxiliary reflecting surface for reflecting another part of the light reflected from the first auxiliary reflecting surface of the reflector, as an auxiliary light distribution pattern, between the light distribution pattern having the cutoff line and the light distribution pattern for overhead sign; and
(vii) a projecting lens for forwardly projecting the light distribution pattern having the cutoff line, the light distribution pattern for overhead sign, and the auxiliary light distribution pattern.

A ninth aspect of the present invention is directed to the vehicle headlamp according to the eighth aspect, wherein:

the additional auxiliary reflecting surface comprises:
a third auxiliary reflecting surface which is provided on a face opposed to the first auxiliary reflecting surface of the cutout portion of the holding member, for reflecting another part of the light reflected from the first auxiliary reflecting surface of the reflector; and
a fourth auxiliary reflecting surface which is provided on a face at a side opposite to a side of shading a part of light reflected from the main reflecting surface of the shade, for reflecting light reflected from the third auxiliary reflecting surface, as an auxiliary light distribution pattern, between the light distribution pattern having the cutoff line and the light distribution pattern for overhead sign.

A tenth aspect of the present invention is directed to the vehicle headlamp according to the ninth aspect, wherein:

the second auxiliary reflecting surface is a reflecting surface for, as a light distribution pattern for overhead sign, reflecting a part of light reflected from the first auxiliary reflecting surface, onto the projecting lens, the light distribution pattern having been passed through the cutout portion at a side opposite to a side of shading a part of light reflected from the main reflecting surface of the shade;

the third auxiliary reflecting surface is a reflecting surface for reflecting another part of the light reflected from the first auxiliary reflecting surface at a side opposite to a side of shading a part of light reflected from the main reflecting surface of the shade; and the fourth auxiliary reflecting surface is a reflecting surface for reflecting light reflected from the third auxiliary reflecting surface onto the projecting lens, as an auxiliary light distribution pattern lens, between the light distribution pattern having the cutoff line and the light distribution pattern for overhead sign.

An eleventh aspect of the present invention is directed to the vehicle headlamp according to the eighth aspect, wherein:
the shade has:
a first edge for forming the cutoff line in the light distribution pattern of the light reflected from the main reflecting surface of the reflector;
a second edge for forming a cutoff line corresponding to a cutoff line of the light distribution pattern in the light distribution pattern for overhead sign of light reflected from the second auxiliary reflecting surface; and
a third edge for forming a cutoff line corresponding to a cutoff line of the light distribution pattern in the auxiliary light distribution pattern of light reflected from the fourth auxiliary reflecting surface.

According to a vehicle headlamp of the present invention, when a semiconductor-type light source is lit to emit light, the light from the semiconductor-type light source is reflected on a main reflecting surface and a first auxiliary reflecting surface. A part of the light reflected from the main reflecting surface is shaded by means of a shade, and a remaining part of the reflected light is projected (illuminated) forwardly from a projecting lens as a light distribution pattern having a cutoff line. In addition, a part of the light reflected from the first auxiliary reflecting surface is reflected on a second auxiliary reflecting surface, and is forwardly projected (illuminated) as a light distribution pattern for overhead sign from the projecting lens. Further, another part of the light reflected from the first auxiliary reflecting surface is reflected on a third auxiliary reflecting surface and the light reflected from the third auxiliary reflecting surface is forwardly projected (illuminated) as an auxiliary light distribution pattern, from the projecting lens between a light distribution pattern having a cutoff line and a light distribution pattern for overhead sign. In this manner, the vehicle headlamp according to the first aspect of the present invention becomes capable of distributing an auxiliary light distribution pattern between the light distribution pattern having the cutoff line and the distribution pattern for overhead sign. As a result, the vehicle headlamp according to the first aspect of the present invention becomes capable of, by means of the auxiliary light distribution pattern, eliminating a dark matter exerted by optical dropout(s) between the cutoff line of the light distribution pattern and the light distribution pattern for overhead sign, thus making it possible to improve visibility and contribute to traffic safety.

In addition, according to the vehicle headlamp of the present invention, the reflected light that is not shaded by means of the shade from the main reflecting surface, passing through a space at the shading side of the shade on a meridional image of the projecting lens, is projected (illuminated) forwardly from the projecting lens, as a light distribution pattern having a cutoff line. In addition, light reflected from a second auxiliary reflecting surface, passing through a cutout portion at a side opposite to the shading side of the shade on the meridional image face of the projecting lens, is projected (illuminated) forwardly from the projecting lens, as a light distribution pattern for overhead sign. Further, light reflected from a fourth auxiliary reflecting surface, passing through a cutout portion at a side opposite to the shading side of the shade on the meridional image face of the projecting lens, is projected (illuminated) as an auxiliary light distribution pattern forwardly from the projecting lens between the light distribution pattern having the cutoff line and the light distribution pattern for overhead sign. In this manner, the vehicle headlamp according to the first aspect of the present invention becomes capable of reliably distributing the auxiliary light distribution pattern having the cutoff line and the light distribution pattern for overhead sign with a simplified structure. As a result, the vehicle headlamp according to the first aspect of the present invention becomes capable of, by means of the auxiliary light distribution pattern, eliminating a dark matter exerted by optical dropout(s) between the cutoff line of the light distribution pattern and the light distribution pattern for overhead sign, thus making it possible to improve visibility and contribute to traffic safety.

DESCRIPTION OF THE PREFERRED EMBODIMENT(S)

Hereinafter, an embodiment of a vehicle headlamp according to the present invention will be described in detail referring to the drawings. This embodiment does not limit the present invention.

Figure 1:
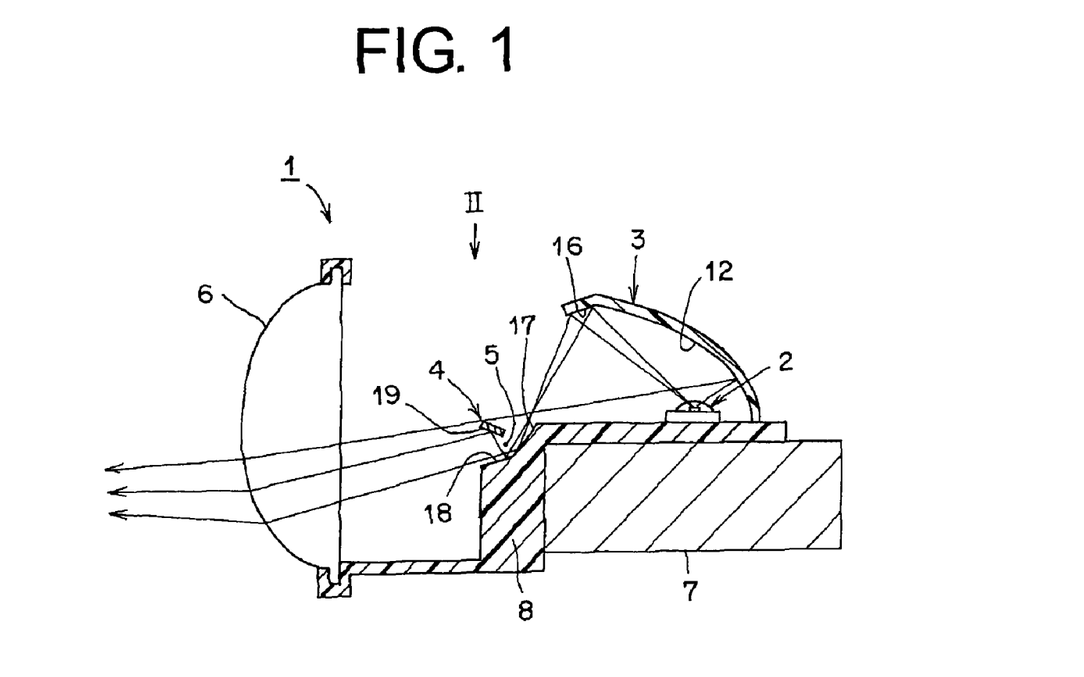
FIG. 1 is a longitudinal cross-sectional view (vertical cross-sectional view) of a lamp unit, showing an embodiment of a vehicle headlamp according to the present invention, the cross-sectional view being taken along the line I-I in FIG. 2.

First, a configuration of the vehicle headlamp in the embodiment will be described hereinafter. In FIG. 1, reference numeral 1 designates the vehicle headlamp in the embodiment. The vehicle headlamp 1 is of projector type, and forms a unitary structure. The vehicle headlamp 1 is made up of: a semiconductor-type light source 2; a reflector 3; a shade 4; a projecting lens 6; a heat sink member 7; a holding member 8; and a lamp housing and a lamp lens of the vehicle headlamp (such as a transparent outer lens, for example), although not shown.

The semiconductor-type light source 2, the reflector 3, the shade 4, the projecting lens 6, the heat sink member 7, and the holding member 8 constitute a lamp unit. The lamp unit is disposed in one or plurality via an optical-axis adjustment mechanism, for example, in a lamp room partitioned by the lamp housing and the lamp housing of the vehicle headlamp.

Figure 2:
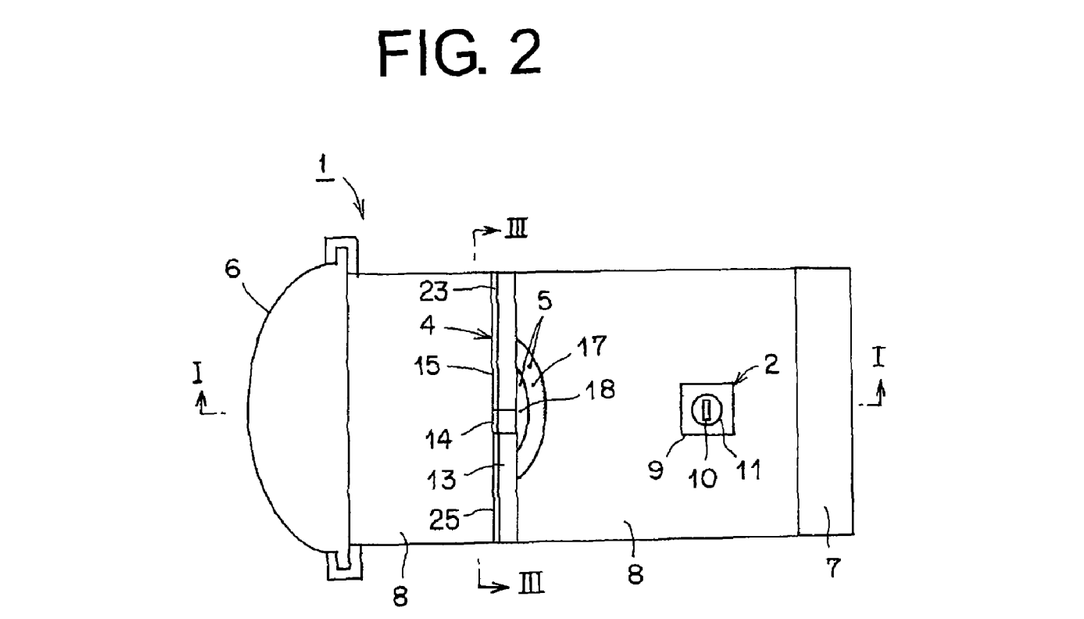
FIG. 2 is a plan view showing a lamp unit, indicated by the arrow II in FIG. 1.
Figure 5:
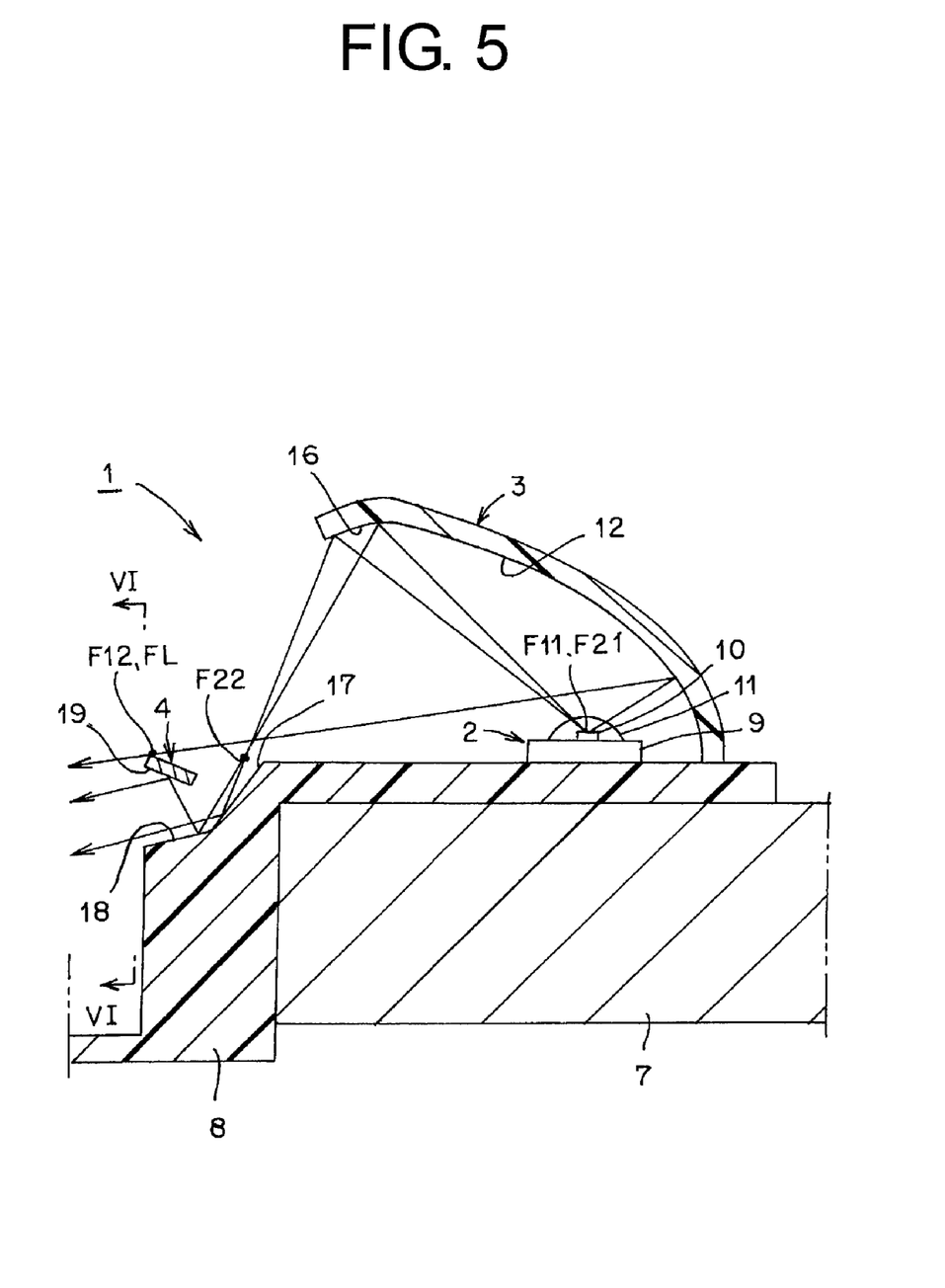
FIG. 5 is a partially enlarged cross-sectional view showing essential parts.

As the semiconductor-type light source 2, for example, a self-emitting light source such as an LED or an EL (organic EL) is used (an LED in the embodiment). The semiconductor-type light source 2, as shown in FIGS. 1, 2, and 5, is made up of: a rectangular board 9; a very small light emitter of a light source chip (semiconductor chip) shaped like a rectangular solid, formed all over the board 9; and a hemispheric light transmission member (lens) 11 covering the light emitter 10. The semiconductor-type light source 2 is fixed at the holding member 8. The semiconductor-type light source 2 may be directly fixed at the heat sink member 7 without interposing the holding member 8.

The reflector 3 is made up of an optically opaque resin member. In addition, the reflector 3, as shown in FIG. 1, opens semi-circularly at a front side portion and opens at a downside portion, whereas it is closed from the front side portion up to a rear side portion through a central portion (upside portion). The reflector 3 is fixed at the holding member 8. Aluminum vapor deposition or silver plating and the like is applied to a concaved interior face of the closed portion of the reflector 3, and a main reflecting surface 12 and a first auxiliary reflecting surface 16 are provided, respectively.

The main reflecting surface 12 is provided on the concaved interior face from the central portion (upside portion) to the rear side portion of the reflector 3 The main reflecting surface 12 is a convergent elliptical reflecting surface. In other words, the main reflecting surface 12 is a free curved face (NURBS-curved face) with an ellipse being a base (a reference or key). The reflecting surface of the free curved face (NURBS-curved face) with the ellipse being a base is made of: a reflecting surface shaped like an ellipse in the vertical cross-sectional view of FIG. 1; and a parabola or a transformed parabola in the horizontal cross-sectional view, although not shown. The main reflecting surface 12 has a first focal point F11, a second focal point F12, and an optical axis (not shown). The second focal point F12 is obtained as a focal line on the horizontal cross-sectional view, i.e., a focal line, both ends of which are positioned at the front side and a center of which is positioned at the rear side, as viewed from the top (plan view). The light emitter 10 of the semiconductor-type light source 2 is positioned at or near the first focal point F11 of the main reflecting surface 12 of the reflector 3. The main reflecting surface 12 may be a reflecting surface made of a mere rotational elliptical face having a first focal point, a second focal point, and an optical axis. In this case, the second focal point is obtained as a focal point, not as a focal line. The main reflecting surface 12 of the reflector 3 is intended to reflect light from the semiconductor-type light source 2.

The first auxiliary reflecting surface 16 is provided on the concaved interior face of the closed portion from the front side portion to the central portion (upside portion) of the reflector 3. The first auxiliary reflecting surface 16 is a convergent elliptical reflecting surface. In other words, the first auxiliary reflecting surface 16, like the main reflecting surface 12, is a free curved face (NURBS-curved face) with an ellipse being a base (a reference or key). The reflecting surface of the free curved face (NURBS-curved face) with the ellipse being a base is made of a reflecting surface shaped like an ellipse in the vertical cross-sectional view of FIG. 1 and a parabola or a transformed parabola in the horizontal cross-sectional view, although not shown. The first auxiliary reflecting surface 16 has a first reflecting focal point F21, a second focal point F22, and an optical axis (not shown). The light emitter 10 of the semiconductor-type light source 2 is positioned at or near the first focal point F21 of the first auxiliary reflecting surface 16 of the reflector 3 The first auxiliary reflecting surface 16 may be a reflecting surface made of a mere rotational elliptical face having a first focal point, a second focal point, and an optical axis. In this case, the second focal point is obtained as a focal point, not as a focal line. The first auxiliary reflecting surface 16 of the reflector 3 is intended to reflect light from the semiconductor-type light source 2.

Figure 3:
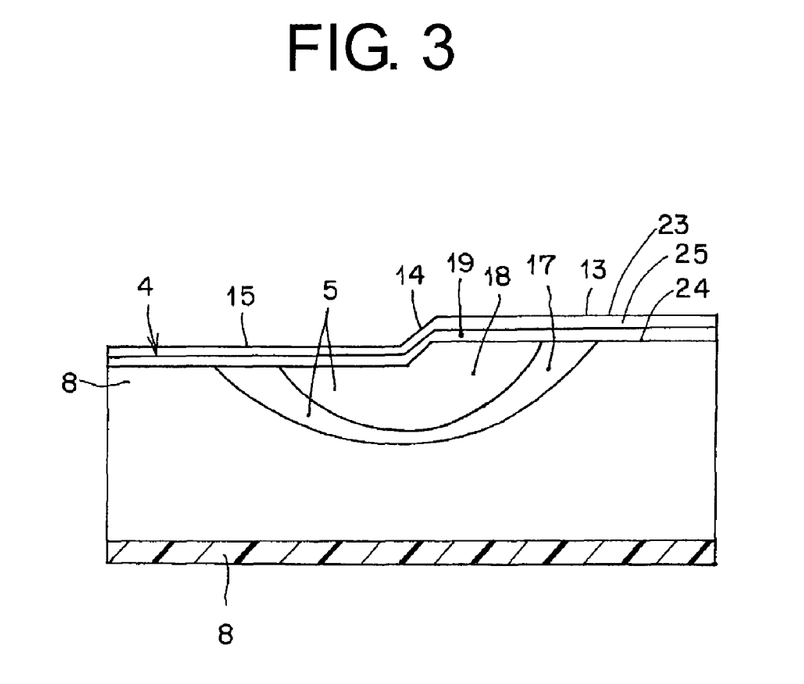
FIG. 3 is a cross-sectional view taken along the line III-III in FIG. 2.
Figure 7:
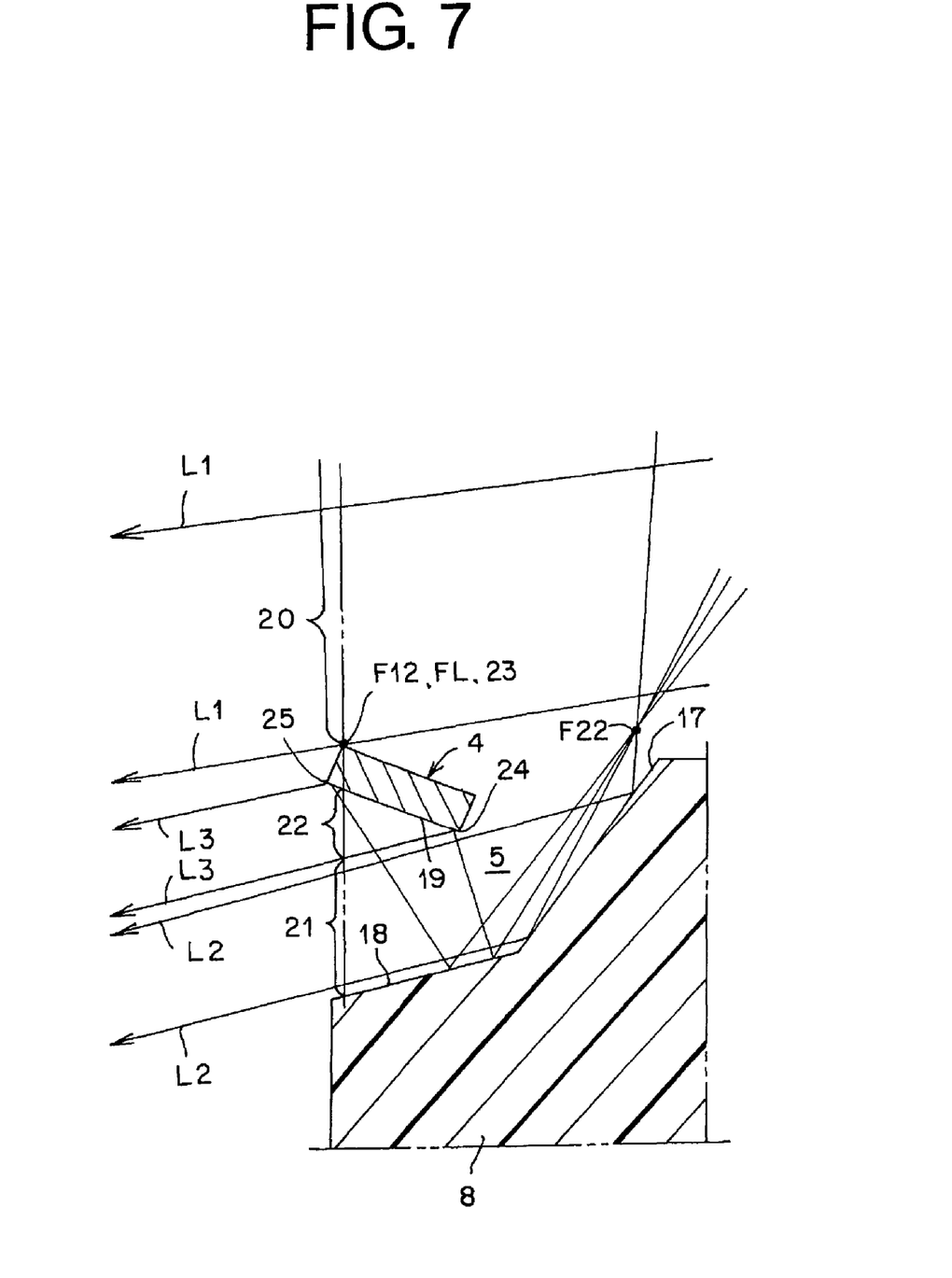
FIG. 7 is an explanatory view showing an optical pathway forming a light distribution pattern for passing, a light distribution pattern for overhead sign, and an auxiliary light distribution pattern, on a meridional image surface of a projecting lens.

The shade 4 is made up of an optically opaque member. The shade 4 is fixed at the holding member 8. The shade 4, as shown in FIGS. 1, 5, and 7, is shaped like a rectangle in its longitudinal cross-sectional view and is inclined upward at its front end (an end in the light illumination direction side) and downward at its rear end. In addition, the shade 4, as shown in FIG. 2, is shaped line an elongated rectangle when it is seen from above. Further, the shade 4, as shown in FIG. 3, is shaped like a band made of an upper horizontal portion 13, an oblique portion 14, and a lower horizontal portion 15. At the shade 4, a first edge 23 of a corner portion formed between an upper face and a front face; a second edge 24 of a corner portion formed between a lower face and a rear face; and a third edge 25 of a corner portion formed between the front face and the lower face are provided, respectively. The first edge 23 of the shade 4 is positioned at or near the second focal point F12 of the main reflecting surface 12 of the reflector 3.

The shade 4 is intended to shade a part of light from the semiconductor-type light source 2, the light being reflected from the main reflecting surface 12 of the reflector 3, and form a light distribution pattern having cutoff lines CL1, CL2, CL3 by the remaining part of the reflected light, for example, a light distribution pattern LP for passing. The first edge 23 of the upper horizontal portion 13, the oblique portion 14, and the lower horizontal portion 15 of the shade 4 forms a lower horizontal cutoff line CL1, an oblique cutoff line CL2, and an upper horizontal cutoff line CL3, respectively, of the light distribution pattern LP for passing.

The projecting lens 6, as shown in FIGS. 1 and 2, is fixed at the holding member 8. The projecting lens 6 is a non-spherical convex lens. The frontal side (external side) of the projecting lens 6 is shaped like a convex non-spherical face, and the rear side of the projecting lens 6 (the side of the semiconductor-type light source 2) is shaped like a flat non-spherical face (flat face). The frontal side of the projecting lens 6 may be shaped like a convex non-spherical face with a large curvature (with a small radius of curvature), or alternatively, the rear side of the projecting lens 6 may be a convex non-spherical face with a small curvature (with a large radius of curvature). By using such a projecting lens 6, a focal point distance of the projecting lens 6 is reduced, and the dimensions in the optical-axis direction of the projecting lens 6 of the vehicle headlamp 1 in the embodiment become compact, accordingly.

The projecting lens 6 has: a front side focal point (a focal point at the side of semiconductor-type light source 2) and a rear focal point (an external side focal point); and an optical axis connecting the front side focal point and the rear side focal point to each other. An optical axis of the main reflecting surface 12 of the reflector 3 and an optical axis of the projecting lens 6 are (substantially) coincident with each other. The front side focal point of the projecting lens 6 is a lens focal point FL (a meridional image face as a focal point face at the object space side). The lens focal point FL of the projecting lens 6 is positioned at or near the second focal point F12 of the main reflecting surface 12 of the reflector 3. The light from the semiconductor-type light source 2 does not have a high heat, so that a resin-based lens can be used as the projecting lens 6. The projecting lens 6 is made of acryl in the embodiment. The projecting lens 6 is intended to project (illuminate): the light distribution pattern LP for passing, having the cutoff lines CL1, CL2, CL3; a light distribution pattern OP for overhead sign; and an auxiliary light distribution pattern SP, toward the forward direction (of a vehicle).

The heat sink member 7 is fixed at the holding member 8. The heat sink member 7 is shaped like a fin, for example. The heat sink member 7 is intended to radiate (dissipate) a heat generated in the semiconductor-type light source 2 to the outside via the holding member 8.

The holding member 8 is intended to fix the semiconductor-type light source 2, the reflector 3, the shade 4, the projecting lens 6, and the heat sink member 7. In other words, the holding member 8 is made of: an upper horizontal portion at which the semiconductor-type light source 2, the reflector 3, and the shade 4 are fixed; a lower horizontal portion at which the projecting lens 6 is fixed; and a vertical portion provided between the upper horizontal portion and the lower horizontal portion. The shade 4 is fixed at a corner portion between the upper horizontal portion and the vertical portion. A cutout portion 5 for light transmission is provided near the shape 4, i.e., at a central portion of the corner portion between the upper horizontal portion and the vertical portion, of the holding member 8. The cutout portion 5 is formed in a substantial L-shape in the longitudinal cross-sectional views of FIGS. 1, 5, and 7; is shaped like a part of an ellipse when it is seen from the plan view of FIG. 2; and further, is shaped like a part of an ellipse when it is seen from a front view of FIG. 3 as well.

A second auxiliary reflecting surface 17 and a third reflecting surface 18 are provided on a face opposed to the first auxiliary reflecting surface 16 of the cutout portion 5. A fourth auxiliary reflecting surface 19 is provided on a face at a side opposite to a side of shading a part of the light reflected from the main reflecting surface 12 of the shade 4.

The second auxiliary reflecting surface 17 is provided on a vertical face among the faces of the cutout portion 5. The second auxiliary reflecting surface 17 is opposed to the first auxiliary reflecting surface 16 and a downside space 21 of the cutout portion 5 at a side opposite to the side of shading a part of the light reflected from the main reflecting surface 12 of the shade 4. The second auxiliary reflecting surface 17 is a reflecting surface for, as a light distribution pattern OP for overhead sign, reflecting a part of the light reflected from the first auxiliary reflecting surface 16, onto the side of the projecting lens 6, the light distribution pattern having been passed through the cutout portion 5 at a side opposite to the side of shading a part of the light reflected from the main reflecting surface 12 of the shade 4.

The third auxiliary reflecting surface 18 is provided on a substantially horizontal face among the faces of the cutout portion 5. The third auxiliary reflecting surface 18 is opposed to the first auxiliary reflecting surface 16 and the fourth auxiliary reflecting surface 19. The third auxiliary reflecting surface 18 is a reflecting surface for reflecting another part of the light reflected from the first auxiliary reflecting surface 16 on a face at a side opposite to the side of shading a part of the light reflected from the main reflecting surface 12 of the shade 4.

The fourth auxiliary reflecting surface 19 is provided on a face at a side opposite to the side of shading a part of the light reflected from the main reflecting surface 12 of the shade 4. The fourth auxiliary reflecting surface 19 is opposed to the third auxiliary reflecting surface 18 and an upside space 22 of the cutout portion 5 opposite to the side of shading a part of the light reflected from the main reflecting surface 12 of the shade 4. The fourth auxiliary reflecting surface 19 is a reflecting surface for reflecting the light reflected from the third auxiliary reflecting surface 18, as an auxiliary light distribution pattern SP, between the light distribution pattern LP for passing, having the cutoff line CL1, CL2, CL3, and the light distribution pattern OP for overhead sign, onto the side of the projecting lens 6.

The second auxiliary reflecting surface 17, the third auxiliary reflecting surface 18, and the fourth auxiliary reflecting surface 19 are made of reflecting surfaces of free curved faces (NURBS-curved faces). The free curved faces (NURBS-curved faces) of the main reflecting surface 12, the first auxiliary reflecting surface 16, the second auxiliary reflecting surface 17, the third auxiliary reflecting surface 18 and the fourth auxiliary reflecting surface 19 are NURBS (Non-Uniform Rational B-Spline Surface) free curved faces, described in the literature entitled "Mathematical Elements for Computer Graphics (David F. Rogers, J Alan Adams)".

The vehicle headlamp 1 in the embodiment is made of the above-described constituent elements, and hereinafter, functions of the headlamp will be described.

Figure 6A:
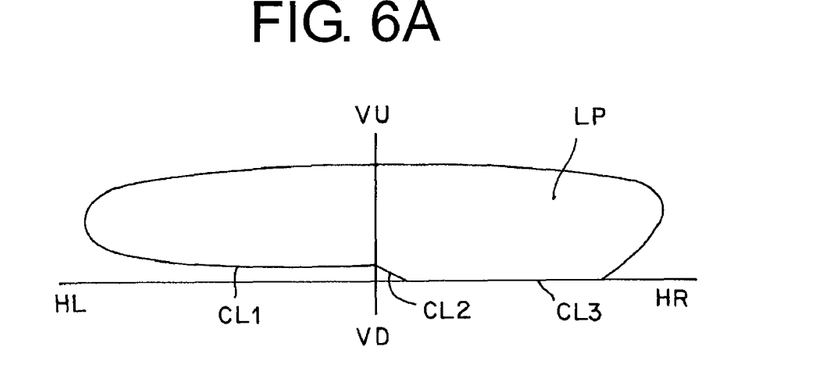
FIG. 6A, FIG. 6B, and FIG. 6C are explanatory views each showing a light distribution pattern for passing, a light distribution pattern for overhead sign, and an auxiliary light distribution pattern, on a meridional image surface of a projecting lens, and are cross-sectional explanatory views each taken along the line VI-VI in FIG. 5.

First, a light emitter of a semiconductor-type light source 2 of the vehicle headlamp 1 is lit to emit light. Afterwards, light (indicated by the solid-line arrow in the figure) is radiated from a light emitter 10 of the semiconductor-type light source 2. A part of the light from the semiconductor-type light source 2 is reflected on a main reflecting surface 12 of a reflector 3. The reflected light converges (concentrates) on a second focal point F12 of the main reflecting surface 12. A part of the reflected light converging on the second focal point F12 is cut off by a shade 4. The reflected light L1 that is not cut off by the shade 4, as shown in FIG. 6A and FIG. 7, passes through a space 20 at the shading side of the shade 4 on a meridional image face of a projecting lens 6 (on the double-dotted chain line in FIG. 7); forms a light distribution pattern LP for passing, having cutoff lines CL1, CL2, CL3; and proceeds to the side of the projecting lens 6. In FIG. 6A showing a state before light transmission through the projecting lens 6, the cutoff lines CL1, CL2, CL3 formed at the first edge 23 of the shade 4 are positioned at a lower rim of the light distribution pattern LP for passing. When the reflected light L1 passes through the projecting lens 6, the light distribution pattern LP for passing, shown in FIG. 6A, is longitudinally and transversely inverted, and is obtained as the light distribution pattern LP for passing, in which the cutoff lines CL1, CL2, CL3 are positioned at an upper rim.

Figure 6B:
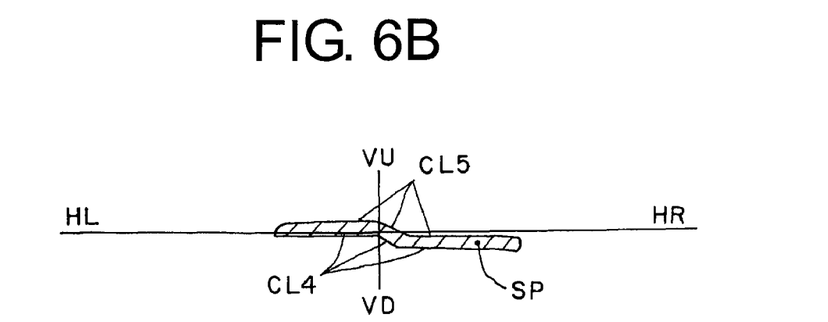
Figure 6C:
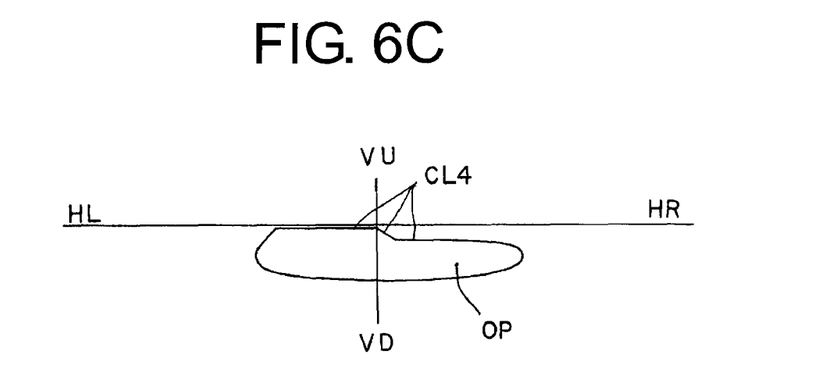

In addition, another part of the light from the semiconductor-type light source 2 is reflected on the first auxiliary reflecting surface 16 of the reflector 3. The reflected light converges (concentrates) on a second focal point F22 of a first auxiliary reflecting surface 16. A part of the reflected light converging on the second focal point F22 is reflected on a second auxiliary reflecting surface 17. The reflected light L2, as shown in FIGS. 6C and 7, passes through a downside space 21 of a cutout portion 5 at a side opposite to the side at which the shade 4 on the meridional image face of the projecting lens (on the double-dotted chain line in FIG. 7); forms a light distribution pattern OP for overhead sign; and proceeds to the side of the projecting lens 6. A cutoff line CL4 is formed in the light distribution pattern OP for overhead sign. The cutoff line CL4 is formed by a second edge 24 of the shade 4 when the light distribution pattern OP for overhead sign, as the light reflected from the second auxiliary reflecting surface 17, passes through the downside space 21 of the cutout portion 5. This cutoff line is equivalent to the cutoff lines CL1, CL2, CL3 of the light distribution pattern LP for passing, and is made of an upper horizontal cutoff line, an oblique cutoff line, and a lower horizontal cutoff line. In FIG. 6C showing a state before light transmission through the projecting lens 6, the cutoff line CL4 formed by the second edge 24 of the shade 4 is positioned at an upper rim of the light distribution pattern OP for overhead sign. When the reflected light L2 passes through the projecting lens 6, the light distribution pattern OP for overhead sign, shown in FIG. 6C, is longitudinally and transversely inverted, and is obtained as the light distribution pattern OP for overhead pattern, shown in FIG. 4, i.e., the light distribution pattern OP for overhead sign, in which the cutoff line CL4 is positioned at a lower rim.

Further, another part of the reflected light converging on the second focal point F22 is reflected on the third auxiliary reflecting surface 18 to the opposite side to the shading side of the shade 4. The reflected light is further reflected on a fourth auxiliary reflecting surface 19. The reflected light L3, as shown in FIGS. 6B and 7, passes through a space 22 of the cutout portion 5 opposing to the opposite side to the shading side of the shade 4 on the meridional image face of the projecting lens (on the double-dotted chain line in FIG. 7); forms an auxiliary light distribution pattern SP arranged between the light distribution pattern LP for passing, having the cutoff lines CL1, CL2, CL3, and the light distribution pattern OP for overhead sign; and proceeds to the side of the projecting lens 6. In the auxiliary light distribution pattern SP, cutoff lines CL4, CL5 are formed, respectively. The cutoff lines CL4, CL5 are formed by the second edge 24 and a third edge 25, of the shade 4, when the light reflected from the third auxiliary reflecting surface 18 is reflected on the fourth auxiliary reflecting surface 19 and the auxiliary light distribution pattern SP passes through the upside space 22 of the cutout portion 5. These cutoff lines CL4, CL5 are equivalent to the cutoff lines CL1, CL2, CL3 of the light distribution pattern LP for passing, and the cutoff line CL4 of the light distribution pattern OP for overhead sign; and are made of an upper horizontal cutoff line; an oblique cutoff line; and a lower horizontal cutoff line. In FIG. 6B showing a state before light transmission through the projecting lens 6, the cutoff line CL4 formed by the second edge 24 of the shade 4 is positioned at a lower rim of the auxiliary light distribution pattern SP, whereas the cutoff line CL5 formed by the third edge 25 of the shade 4 is positioned at an upper rim of the auxiliary light distribution pattern SP. When reflected light L3 passes through the projecting lens 6, the auxiliary light distribution pattern SP shown in FIG. 6B is longitudinally and transversely inverted, and is obtained as the light distribution pattern SP shown in FIG. 4, i.e., the auxiliary light distribution pattern SP in which the cutoff line CL4 is positioned at an upper rim and the cutoff line CL5 is positioned at a lower rim, respectively.

The light distribution pattern LP for passing, having the cutoff lines CL1, CL2, CL3 shown in FIG. 6A; the light distribution pattern OP for overhead sign, having the cutoff line CL4 shown in FIG. 6C; and the auxiliary light distribution pattern SP having the cutoff lines CL4, CL5 shown in FIG. 6B pass through the projecting lens 6; are longitudinally and transversely inverted; and are projected (illuminated) from the projecting lens 6 toward the forward direction of an automobile (vehicle); and illuminate a road surface or the like.

The vehicle headlamp 1 in the embodiment is made of the constituent elements and effect as described above, and hereinafter, advantageous effect thereof will be described.

Figure 4:
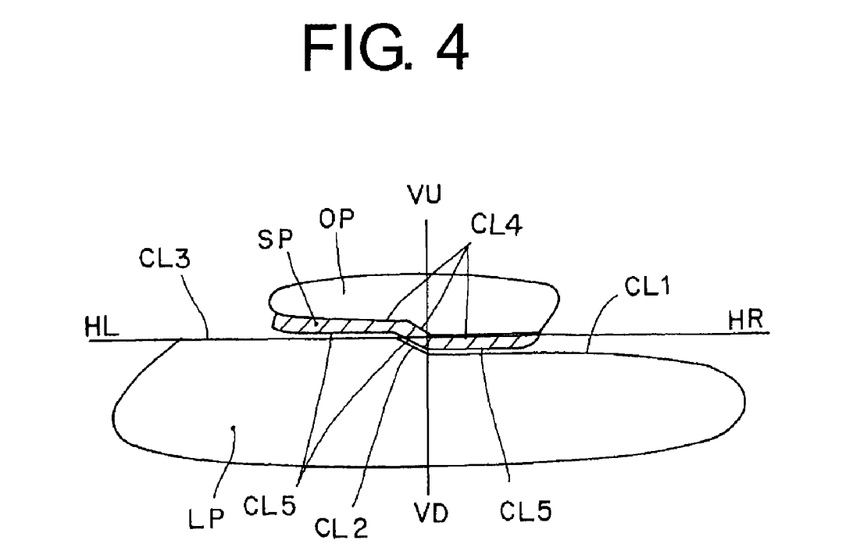
FIG. 4 is an explanatory view showing a light distribution pattern for passing, a light distribution pattern for overhead sign, and an auxiliary light distribution pattern, illuminated from a lamp unit.

The vehicle headlamp 1 in the embodiment, as shown in FIG. 4, is capable of distributing the auxiliary light distribution pattern SP between the light distribution pattern LP for passing, having the cutoff lines CL1, CL2, CL3, and the light distribution pattern OP for overhead sign. As a result, the vehicle headlamp 1 in the embodiment is capable of, by means of the auxiliary light distribution pattern SP, eliminating a dark matter exerted by optical dropout(s) between a respective one of the cutoff lines CL1, CL2, CL3 of the light distribution pattern LP for passing and the cutoff line of the light distribution pattern of the light distribution pattern OP for overhead sign, thus making it possible to improve visibility and contribute to traffic safety.

In addition, the vehicle headlamp 1 in the embodiment, as shown in FIGS. 4, 6A, and 7, is provided in such a manner that the reflected light L1 that is not shaded by means of the shade 4, the light from the main reflecting surface 12, passing through the space 20 at the shading side of the shade 4 on the meridional image face of the projecting lens 6 (on the double-dotted chain line in FIG. 7), is projected (illuminated) from the projecting lens 6 toward the forward direction, as the light distribution pattern LP having the cutoff lines CL1, CL2, CL3. In addition, the vehicle headlamp 1 in the embodiment, as shown in FIGS. 4, 6C, and 7, is provided in such a manner that the reflected light L2 from the second auxiliary reflecting surface 17, passing through the downside space 21 of the cutout portion 5 at a side opposite to the shading side of the shade 4 on the meridional image face of the projecting lens 6 (on the double-dotted chain line in FIG. 7), is forwardly projected (illuminated) as a light distribution pattern OP for overhead sign from the projecting lens 6. Further, the vehicle headlamp 1 in the embodiment, as shown in FIGS. 4, 6B, and 7, is provided in such a manner that reflected light L3 from the fourth auxiliary reflecting surface 19, passing through an upside space 22 of the cutout portion 5 opposing to the opposite side to the shading side of the shade 4 on the meridional image face of the projecting lens 6 (on the double-dotted chain line in FIG. 7), is forwardly projected (illuminated) from the projecting lens 6 to between the light distribution pattern LP for passing, having the cutoff lines CL1, CL2, CL3, and the light distribution pattern OP for overhead sign.

In other words, as shown in FIG. 4, the auxiliary light distribution pattern SP is arranged between a respective one of the cutoff lines CL1, CL2, CL3 at the upper rim of the light distribution pattern LP for passing and the cutoff line CL4 at the lower rim of the light distribution pattern OP for overhead sign. At this time, the cutoff line CL4 at the upper rim of the auxiliary light distribution pattern SP is coincident with the cutoff line CL4 at the lower rim of the auxiliary light distribution pattern SP, and a slight gap is merely formed between the cutoff line CL5 at the lower rim of the auxiliary light distribution pattern SP and the cutoff lines CL1, CL2, CL3 at the upper rim of the auxiliary light distribution pattern LP for passing. However, leakage light from the lower rim of the auxiliary light distribution pattern SP and leakage light from the upper rim of the light distribution pattern LP for passing are superimposed on each other in the abovementioned slight gap, so that optical dropout(s) can be reliably prevented.

In this manner, the vehicle headlamp 1 in the embodiment is capable of reliably distributing the auxiliary light distribution pattern SP between the light distribution pattern LP for passing, having the cutoff lines CL1, CL2, CL3 and the light distribution pattern OP for overhead sign, with a simplified structure. As a result, the vehicle headlamp 1 in the embodiment is capable of, by means of the auxiliary light distribution pattern SP, reliably eliminating a dark matter exerted by optical dropout(s) between a respective one of the cutoff lines CL1, CL2, CL3 of the light distribution pattern LP for passing and the light distribution pattern OP for overhead sign, thus making it possible to improve visibility and contribute to traffic safety.

Hereinafter, an example other than the foregoing embodiment will be described. The foregoing embodiment described the light distribution pattern LP for passing, as a light distribution pattern having the cutoff lines CL1, CL2, CL3. However, in the present invention, a light distribution pattern having a cutoff line may be employed as a light distribution pattern for expressway.

What is claimed is:

1. A vehicle headlamp, comprising:
   (i) a semiconductor-type light source;
   (ii) a reflector having a main reflecting surface and a first auxiliary reflecting surface for reflecting light from the semiconductor-type light source;
   (iii) a shade for shading a part of light reflected from the main reflecting surface of the reflector to form a light distribution pattern having a cutoff line by a remaining part of the reflected light;
   (iv) a second auxiliary reflecting surface for reflecting a part of the light reflected from the first auxiliary reflecting surface of the reflector, as a light distribution pattern for overhead sign;
   (v) a third auxiliary reflecting surface for reflecting another part of the light reflected from the first auxiliary reflecting surface of the reflector;
   (vi) a fourth auxiliary reflecting surface for reflecting the light reflected from the third auxiliary reflecting surface, as an auxiliary light distribution pattern, between the light distribution pattern having the cutoff line and the light distribution pattern for overhead sign; and
   (vii) a projecting lens for forwardly projecting the light distribution pattern having the cutoff line, the light distribution pattern for overhead sign, and the auxiliary light distribution pattern,
   wherein the first auxiliary reflecting surface is arranged above the second, third and fourth auxiliary reflecting surfaces, and the second auxiliary reflecting surface is arranged above the third auxiliary reflecting surface.

2. The vehicle headlamp according to claim 1, further comprising a holding member for holding the semiconductor-type light source, the reflector, the shade, and the projecting lens, wherein:
   a cutout portion for light transmission is provided near the shade of the holding member;
   the second auxiliary reflecting surface and the third auxiliary reflecting surface are provided on a face opposed to the first auxiliary reflecting surface of the cutout portion;
   the fourth auxiliary reflecting surface is provided on a face at a side opposite to a side of shading a part of light reflected from the main reflecting surface of the shade;
   the second auxiliary reflecting surface is a reflecting surface for, as a light distribution pattern for overhead sign, reflecting a part of light reflected from the first auxiliary reflecting surface, onto the projecting lens, the light distribution pattern having passed through the cutout portion at a side opposite to a side of shading a part of light reflected from the main reflecting surface of the shade;
   the third auxiliary reflecting surface is a reflecting surface for reflecting another part of the light reflected from the first auxiliary reflecting surface at a side opposite to a side of shading a part of light reflected from the main reflecting surface of the shade; and
   the fourth auxiliary reflecting surface is a reflecting surface for reflecting light reflected from the third auxiliary reflecting surface onto the projecting lens, as an auxiliary light distribution pattern, between the light distribution pattern having the cutoff line and the light distribution pattern for overhead sign.

3. The vehicle headlamp according to claim 1, wherein: the shade has:
   a first edge for forming the cutoff line in the light distribution pattern of the light reflected from the main reflecting surface of the reflector;
   a second edge for fanning a cutoff line corresponding to a cutoff line of the light distribution pattern in the light distribution pattern for overhead sign of light reflected from the second auxiliary reflecting surface; and
   a third edge for forming a cutoff line corresponding to a cutoff line of the light distribution pattern in the auxiliary light distribution pattern of light reflected from the fourth auxiliary reflecting surface.

4. A vehicle headlamp, comprising:
   (i) a semiconductor-type light source;
   (ii) a reflector having a main reflecting surface and a first auxiliary reflecting surface for reflecting light from the semiconductor-type light source;
   (iii) a shade for shading a part of light reflected from the main reflecting surface of the reflector to form a light distribution pattern having a cutoff line by a remaining part of the reflected light;
   (iv) a second auxiliary reflecting surface for reflecting a part of light reflected from the first auxiliary reflecting surface of the reflector, as a light distribution pattern for overhead sign;
   (v) an additional auxiliary reflecting surface for reflecting another part of the light reflected from the first auxiliary reflecting surface of the reflector, as an auxiliary light distribution pattern, substantially only between the light distribution pattern having the cutoff line and the light distribution pattern for overhead sign; and
   (vi) a projecting lens for forwardly projecting the light distribution pattern having the cutoff line, the light distribution pattern for overhead sign, and the auxiliary light distribution pattern.

5. The vehicle headlamp according to claim 4, wherein: the additional auxiliary reflecting surface comprises:
   a third auxiliary reflecting surface for reflecting another part of the light reflected from the first auxiliary reflecting surface of the reflector; and
   a fourth auxiliary reflecting surface for reflecting light reflected from the third auxiliary reflecting surface, as an auxiliary light distribution pattern, between the light distribution pattern having the cutoff line and the light distribution pattern for overhead sign.

6. The vehicle headlamp according to claim 5, further comprising:
   a holding member for holding the semiconductor-type light source, the reflector, the shade, and the projecting lens, wherein:
   a cutout portion for light transmission is provided near the shade of the holding member;
   the second auxiliary reflecting surface and the third auxiliary reflecting surface are provided on a face opposed to the first auxiliary reflecting surface of the cutout portion;
   the fourth auxiliary reflecting surface is provided on a face at a side opposite to a side of shading a part of light reflected from the main reflecting surface of the shade;
   the second auxiliary reflecting surface is a reflecting surface for, as a light distribution pattern for overhead sign, reflecting a part of light reflected from the first auxiliary reflecting surface, onto the projecting lens, the light distribution pattern having been passed through the cutout portion at a side opposite to a side of shading a part of light reflected from the main reflecting surface of the shade;
   the third auxiliary reflecting surface is a reflecting surface for reflecting another part of the light reflected from the first auxiliary reflecting surface at a side opposite to a side of shading a part of light reflected from the main reflecting surface of the shade; and the fourth auxiliary reflecting surface is a reflecting surface for reflecting light reflected from the third auxiliary reflecting surface, as an auxiliary light distribution pattern, between the light distribution pattern having the cutoff line and the light distribution pattern for overhead sign, onto the projecting lens.

7. The vehicle headlamp according to claim 4, wherein: the shade has:
- a first edge for forming the cutoff line in the light distribution pattern of the light reflected from the main reflecting surface of the reflector;
- a second edge for forming a cutoff line corresponding to a cutoff line of the light distribution pattern in the light distribution pattern for overhead sign of light reflected from the second auxiliary reflecting surface; and
- a third edge for forming a cutoff line corresponding to a cutoff line of the light distribution pattern in the auxiliary light distribution pattern of light reflected from the fourth auxiliary reflecting surface.

8. A vehicle headlamp, comprising:
(i) a semiconductor-type light source;
(ii) a reflector having a main reflecting surface and a first auxiliary reflecting surface for reflecting light from the semiconductor-type light source;
(iii) a shade for shading a part of light reflected from the main reflecting surface of the reflector to form a light distribution pattern having a cutoff line by a remaining part of the reflected light;
(iv) a holding member for holding the shade, wherein a cutout portion for light transmission to be formed near the shade is between an upper portion and a vertical portion of the holding member;
(v) a second auxiliary reflecting surface which is provided on a face opposed to the first auxiliary reflecting surface of the cutout portion of the holding member, for reflecting a part of light reflected from the first auxiliary reflecting surface of the reflector as a light distribution pattern for overhead sign;
(vi) an additional auxiliary reflecting surface for reflecting another part of the light reflected from the first auxiliary reflecting surface of the reflector, as an auxiliary light distribution pattern, between the light distribution pattern having the cutoff line and the light distribution pattern for overhead sign; and
(vii) a projecting lens for forwardly projecting the light distribution pattern having the cutoff line, the light distribution pattern for overhead sign, and the auxiliary light distribution pattern.

9. The vehicle headlamp according to claim 8, wherein: the additional auxiliary reflecting surface comprises:
- a third auxiliary reflecting surface which is provided on a face opposed to the first auxiliary reflecting surface of the cutout portion of the holding member, for reflecting another part of the light reflected from the first auxiliary reflecting surface of the reflector; and
- a fourth auxiliary reflecting surface which is provided on a face at a side opposite to a side of shading a part of light reflected from the main reflecting surface of the shade, for reflecting light reflected from the third auxiliary reflecting surface, as an auxiliary light distribution pattern, between the light distribution pattern having the cutoff line and the light distribution pattern for overhead sign.

10. The vehicle headlamp according to claim 9, wherein:
the second auxiliary reflecting surface is a reflecting surface for, as a light distribution pattern for overhead sign, reflecting a part of light reflected from the first auxiliary reflecting surface, onto the projecting lens, the light distribution pattern having been passed through the cutout portion at a side opposite to a side of shading a part of light reflected from the main reflecting surface of the shade;
the third auxiliary reflecting surface is a reflecting surface for reflecting another part of the light reflected from the first auxiliary reflecting surface at a side opposite to a side of shading a part of light reflected from the main reflecting surface of the shade; and
the fourth auxiliary reflecting surface is a reflecting surface for reflecting light reflected from the third auxiliary reflecting surface onto the projecting lens, as an auxiliary light distribution pattern, between the light distribution pattern having the cutoff line and the light distribution pattern for overhead sign.

11. The vehicle headlamp according to claim 8, wherein: the shade has:
- a first edge for forming the cutoff line in the light distribution pattern of the light reflected from the main reflecting surface of the reflector;
- a second edge for forming a cutoff line corresponding to a cutoff line of the light distribution pattern in the light distribution pattern for overhead sign of light reflected from the second auxiliary reflecting surface; and
- a third edge for forming a cutoff line corresponding to a cutoff line of the light distribution pattern in the auxiliary light distribution pattern of light reflected from the fourth auxiliary reflecting surface.

* * * * *